3,179,718
COMPOSITION COMPRISING BUTADIENE-ACRYLONITRILE COPOLYMER, ETHYLENE-PROPYLENE COPOLYMER, PEROXIDE, AND SULFUR
Peter E. Wei and John Rehner, Jr., Westfield, N.J., assignors to Esso Research and Engineering Company, a corporation of Delaware
No Drawing. Filed Oct. 28, 1960, Ser. No. 65,592
1 Claim. (Cl. 260—889)

This invention relates to vulcanized blends of highly unsaturated rubbers and ethylene-propylene elastomeric copolymers. More particularly, it relates to blends of this nature vulcanized with both an organic peroxide and elemental sulfur.

High unsaturation rubbers find uses in tire treads, windshield channels, cable covering, etc. It is desirable, however, to improve the ozone resistance as well as the cost of the formulations.

It has now surprisingly been found that blends of highly unsaturated rubbers and ethylene-propylene low pressure elastomeric copolymers can be readily vulcanized with both an organic peroxide and elemental sulfur. This is unexpected, since the ethylene-propylene copolymer is chemically saturated and does not undergo any appreciable amount of crosslinking reactions with sulfur or organic peroxide alone.

The ethylene-propylene low pressure copolymers are now well known. For the purpose of convenience, details of the low pressure catalytic process and the products obtained thereby are presented below, although it should be realized that these by themselves constitute no part of this invention. The process is generally described in the laterature, e.g., see "Scientific American," September 1957, pages 98 et seq.

In that process the polymers are prepared by copolymerizing the monomers with the aid of certain polymerization catalysts. The catalysts are solid, insoluble reaction products obtained by partially reducing a heavy metal compound usually the halide of a Group IV-B, V-B and VI-B metal of the Periodic System, such as vanadium tetrachloride, or a titanium halide, e.g., $TiCl_4$, $TiBr_4$, etc., preferably with metallic aluminum. The preferred catalyst of this type is usually prepared by reducing 1 mole of titanium tetrahalide, usually tetrachloride, with about one-third mole of aluminum to give a material corresponding to $TiCl_3.0.33\ AlCl_3$, thus containing cocrystallized $AlCl_3$. (For further details see copending U.S. applications Serial No. 578,198, filed April 6, 1956, now U.S. Patent 3,128,252, and Serial No. 766,376, filed October 19, 1958, now U.S. Patent 3,032,513.) The product is then activated with an aluminum alkyl compound corresponding to the formula RR'ALX. In this formula, R, R' and X preferably are alkyl groups of 2 to 8 carbon atoms, although X may alternatively be hydrogen or halogen, notably chlorine. Typical examples of the aluminum alkyl compounds are aluminum triethyl, aluminum sesquichloride, aluminum triisobutyl, etc.

The monomers are then contacted with the resulting catalyst in the presence of inert hydrocarbon solvents such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5% based on the total liquid, and the polymer product concentration in the polymerization zone is preferably kept between about 2 to 15% based on total contents, so as to allow easy handling of the polymerization mixture. The proper polymer concentration can be obtained by having enough of the inert diluent present or by stopping the polymerization short of 100% conversion. When the desired degree of polymerization has been reached, a $C_1$ to $C_8$ alkanol such as isopropyl alcohol or n-butyl alcohol, is normally added to the reaction mixture for the purpose of dissolving and deactivating the catalyst and for precipitating the polymer product from solution. After filtration, the solid polymer may be further washed with alcohol or acid such as hydrochloric acid, dried, compacted and packaged.

It is to be understood that the term "low pressure" polymer as used herein connotes material prepared in the indicated manner.

The ethylene-propylene copolymers in general have a molecular weight of 25,000 to 1,000,000 as determined from viscosity measurements in tetralin solution, according to the method published by G. Moraglio, La Chimica e l'Industria, volume 41, page 984, 1959, and the amount of ethylene in the copolymers can range from 0 to 100 mole percent, but preferably from 40 to 90 mole percent. The copolymers are further characterized by the following properties: densities ranging from 0.85 to 0.90; percentage by weight insoluble in normal heptane at room temperature, ranging from 10 to 40%; and crystallinity content, as determined by X-ray diffraction, ranging from 0 to 15%. The exact values of these physical characteristics depend on the particular composition of the copolymer, and the conditions of synthesis, catalyst used, etc.

The highly unsaturated rubbers utilized are characterized by unsaturations in the range of 50 to 100 mole percent and thus include natural rubber, butadiene-styrene rubbers (GR-S), butadiene-acrylonitrile rubbers (Paracril), polychloroprene (neoprene), synthetic polyisoprenes, and synthetic polybutadienes.

The proportion of the ethylene-propylene copolymer in the blend is in the range of from 20 to 80 weight percent.

The organic peroxides that can be used include dicumyl peroxide and 2,5 bis(t-butylperoxy)-2,5-dimethyl hexane. Additionally, benzoyl peroxide, chlorobenzoyl peroxide, bromobenzoyl peroxide, tertiary butyl perbenzoate can be employed. In general, dialkyl peroxides, diaroyl peroxides, and unsymmetric alkylaroyl peroxides are preferred. The organic peroxide is utilized in an amount of from 0.5 to 10 weight percent based on the blend to be treated.

The elemental sulfur is utilized in an amount of from 0.1 to 5 weight percent based on the blend.

The treatment of the blend of polymers is effected in the conventional manner, e.g., by thorough contacting of the materials with the vulcanizing agents and fillers as desired on a rubber mill or in a Banbury mixer and vulcanizing the resulting formulation at temperatures of about 200 to 400° F. for from 5 to 150 minutes.

Fillers are also desirable and a variety of carbon blacks which are well known in the art can be employed. The amount of carbon black used is in the range of from 0 to 200 parts by weight, based on 100 parts of polymer blend.

This invention and its advantages will be better understood by reference to the following examples.

EXAMPLE 1.—BLENDS WITH PARACRIL C

Examinations were made of covulcanizates obtained by curing blends of Paracril C and the ethylene-propylene copolymer as taught in this invention. Paracril C is a well-known oil-resistant and hydrocarbon resistant material containing nominally about 35% of acrylonitrile units. Here, the examination of the covulcanizates obtained with sulfur-peroxide curing agents was such as to recognize, if it existed, the general hydrocarbon resistance of the blends versus that obtained with Paracril alone. The importance of this point derives from the fact that butadiene-nitrile copolymer vulcanizates are outstanding in applications requiring a high degree of resistance to hydrocarbon solvents and oils, but that these copolymers are quite expensive.

A series of blends was prepared which contained ethylene-propylene copolymer and Paracril C in different ratios. Most of these were "pure gum" compositions which were cured with a mixture of sulfur and dicumyl peroxide. One composition containing carbon black was also included, as was one in which the dicumyl peroxide was replaced with 2,5-bis(t-butylperoxy)-2,5-dimethyl hexane. Vulcanizates were prepared at two different curing temperatures, and samples from micropads (20 mil) of the vulcanizates were extracted with isooctane for 42 hours at room temperature with occasional mild shaking and replacement with fresh solvent. Isooctane was used here instead of hexane, in order to simulate more closely high-octane gasolines, toward which the resistance of Paracril is well known. Values of percent of vulcanizate extracted by isooctane were determined. Also, determined was the swelling ratio of the vulcanizate. The latter is defined as the ratio $W_s/W_o$, where $W_o$ is the original weight of the test sample, and $W_s$ is its weight after 42 hours of immersion in the isooctane. In short, the swelling ratio is a measure of the resistance of the vulcanizate to a gasoline-like solvent. The experimental results are given in Table I.

In the pure gum compositions, the tensile strengths of the blends are all considerably superior to those of the unblended Paracril C vulcanizate, and the tensile and elongation values differ very little at the three different states of cure. In fact, the tensiles of the blends are comparable to those obtained with unblended ethylene-propylene copolymer vulcanizates. This is also evidence of covulcanization between the two polymeric components, because if either component were present in the vulcanized blend in a chemically uncombined form, the tensile strength of the blend would be a more or less linear function of the blending ratio, as is known to be the case when a polymer is blended with an inert diluent of little or no inherent strength of its own. The blend containing carbon black (Recipe 6) has a higher tensile strength than that of the corresponding pure gum composition (Recipe 3), as would be expected.

EXAMPLE 2.—BLENDS WITH OTHER RUBBERS

Runs were made with pure gum blends of ethylene-propylene copolymer and several other synthetic and natural rubbers (Neoprene GNNW, GR-S 1000, GR-S 1500, and smoked sheets). The results are given in Table III.

*Table III*

| Recipe | 1 | 2 | 3 | 4 | 5 | 6 |
|---|---|---|---|---|---|---|
| Ethylene-propylene copolymer | none | 50 | none | 50 | none | 50 |
| Neoprene GNNW | 100 | 50 | none | none | none | none |
| GR-S 1000 | none | none | 100 | 50 | none | none |
| Smoked sheets | none | none | none | none | 100 | 50 |
| Sulfur | 2 | 2 | 2 | 2 | 2 | 2 |
| Dicumyl peroxide | 4 | 4 | 4 | 4 | 4 | 4 |
| All cures: 30 mins./320° F.: | | | | | | |
| Percent extracted by hexane | 8 | 8 | 16 | 11 | 6 | 7 |
| Tensile, p.s.i. | 1,400 | 1,440 | 280 | 880 | 2,360 | 2,030 |
| Elongation, percent | 600 | 580 | 350 | 530 | 570 | 600 |

*Table I*

| Recipe | 1 | 2 | 3 | 4 | 5 | 6 | 7 |
|---|---|---|---|---|---|---|---|
| Ethylene-propylene copolymer | 100 | 83.3 | 50 | 33.4 | none | 50 | 50 |
| Paracril C | none | 16.7 | 50 | 66.6 | 100 | 50 | 50 |
| Sulfur | 2 | 2 | 2 | 2 | 2 | 2 | 2 |
| Dicumyl peroxide | 4 | 4 | 4 | 4 | 4 | 4 | none |
| Pelletex NS carbon black | none | none | none | none | none | 31 | none |
| 2,5-bis(t-butylperoxy)-2,5-dimethyl hexane | none | none | none | none | none | none | 8.6 |

| | Cured 30 minutes at— | | | |
|---|---|---|---|---|
| Recipe No. | 300° F. | | 340° F. | |
| | Percent extracted | Swelling ratio | Percent extracted | Swelling ratio |
| 1 | 7.3 | 3.2 | 6.4 | 3.1 |
| 2 | 6.5 | 2.5 | 4.6 | 2.5 |
| 3 | 4.4 | 1.8 | 2.2 | 1.8 |
| 4 | 2.3 | | 1.2 | 1.5 |
| 5 | 4.6 | 1.0 | 3.5 | 1.0 |
| 6 | 0.6 | 1.8 | 1.6 | 1.7 |
| 7 | 4.7 | 1.9 | 2.6 | 1.7 |

Tensile data for the compositions of Table I are given in Table II. The table also includes tensile values for the intermediate curing temperature of 320° F.

The neoprene blend data given in Table III show that equal amounts of ethylene-propylene copolymer can be admixed and vulcanized with this elastomer without any

*Table II*

| | Cured for 30 minutes at— | | | | | |
|---|---|---|---|---|---|---|
| Recipe No. (cf. Table I) | 300° F. | | 320° F. | | 340° F. | |
| | Tensile, p.s.i. | Elongation, percent | Tensile, p.s.i. | Elongation, percent | Tensile, p.s.i. | Elongation, percent |
| 1 | 1,510 | 640 | 810 | 600 | 1,160 | 620 |
| 2 | 1,560 | 600 | 1,460 | 600 | 1,380 | 590 |
| 3 | 1,580 | 600 | 1,390 | 630 | 1,580 | 550 |
| 4 | 1,380 | 600 | 1,300 | 610 | 990 | 500 |
| 5 | 580 | 480 | 380 | 440 | 440 | 390 |
| 6 | 2,110 | 580 | 2,670 | 640 | 2,230 | 520 |
| 7 | 5,590 | 730 | 1,720 | 650 | 2,360 | 610 | appreciable change in hexane extractability or tensile strength. This is important because neoprene is a well known rubber whose principal advantage lies in hydrocarbon solvent resistance. However, it is (like Paracril) a relatively expensive elastomer, and Table III therefore indicates that it can be mixed and cured with the inexpensive ethylene-propylene copolymer without suffering a loss in hydrocarbon resistance and strength.

Finally, Table III also shows that the ethylene-propylene copolymer is compatible with natural rubber, and the extractability and tensile strength of the 50/50 blend is practically the same as those of the corresponding natural rubber composition.

EXAMPLE 3.—BLENDS WITH GR–S

Another blend was treated in accordance with this invention and the results are tabulated in Table IV.

Table IV

| Recipe | 1 | 2 | 3 | 4 | 5 | 6 |
|---|---|---|---|---|---|---|
| GR-S-1500 | 100 | 80 | 60 | 40 | 20 | none |
| Ethylene-propylene copolymer | none | 20 | 40 | 60 | 80 | 100 |
| Pelletex carbon black | 100 | 100 | 100 | 100 | 100 | 100 |
| Sulfur | 0.3 | 0.3 | 0.3 | 0.3 | 0.3 | 0.3 |
| Dicumyl peroxide | 1.0 | 1.3 | 1.65 | 2.0 | 2.3 | 2.6 |

CURE TIME: 15 MINS./330° F.

| Stock | Tensile strength, p.s.i. | Percent elongation | Percent weight loss on extraction with toluene |
|---|---|---|---|
| 1 | 1,270 | 390 | 18.8 |
| 2 | 1,770 | 250 | 12.6 |
| 3 | 1,690 | 160 | 11.8 |
| 4 | 1,600 | 155 | 9.9 |
| 5 | 1,610 | 200 | 10.3 |
| 6 | 2,130 | 225 | 9.1 |

OZONE RESISTANCE (0.2% $O_3$, 5.5 HOURS)

| Stock | Time to crack | Time to break |
|---|---|---|
| 1 | 1 min. 10 sec. | 1 min. 15 sec. |
| 2 | 1 min. 10 sec. | 1 min. 20 sec. |
| 3 | 15 min. 30 sec. | 15 min. 34 sec. |
| 4 | 3 hours, 13 min. | >5.5 hours. |
| 5 | >5.5 hours. | >5.5 hours. |
| 6 | >5.5 hours. | >5.5 hours. |

TENSILE STRENGTH AFTER 5.5 HOURS OF OZONE EXPOSURE (0.2% $O_3$)

| Stock | Original | After ozone exposure |
|---|---|---|
| 5 | 1610/200 | 1540/190 |
| 6 | 2130/225 | 1960/240 |

The data of Table IV show that the GR–S and the ethylene-propylene copolymer are compatible over a wide range of blending ratios. They also show that the vulcanizate tensile strength of the GR–S is not impaired through the incorporation even of large amounts of the ethylene-propylene copolymer; nor is the extractability of the vulcanizate by an aromatic solvent (which simulates a high-octane gasoline) appreciably changed by the blending. It is noteworthy that in the vulcanized blends, very little change in strength is encountered even after severe ozone exposure. This in striking contrast to the behavior of unblended vulcanizates of GR–S, which are well known in the art to be very susceptible to ozone, even under conditions far less drastic than those employed in the ozone exposure tests of Table IV.

This invention also has utility for the treatment of blends of ethylene-propylene copolymers and less highly unsaturated polymers such as Vistanex and butyl rubbers.

The advantages of this invention will be apparent to those skilled in the art. Cured polymer products are economically provided of improved tensile strength, softening and melting points, elongation, and equivalent solvent resistance in the less expensive blends.

A processing advantage is that the ethylene-propylene copolymers often do not process readily (i.e. in terms of mill breakdown, adhesion to the mill rolls, etc.); blending with the highly unsaturated rubbers facilities these processing characteristics.

It is to be understood that this invention is not limited to the specific examples which have been offered merely as illustrations, and that modifications may be made without departing from the spirit of the invention.

What is claimed is:

A composition of matter comprising a blend of 50 to 80 weight percent butadiene-acrylonitrile rubber having an unsaturation of from 50 to 100 mole percent and 20 to 50 weight percent of an ethylene-propylene elastomeric copolymer having a density of about 0.85 to 0.90 and a crystallinity of from 0 to 15%, said copolymer containing from 40 to 90 mole percent combined ethylene, and said blend having been covulcanized with about 0.5 to 10 weight percent dicumyl peroxide and about 0.1 to 5 weight percent of elemental sulfur at about 200 to 400° F.

References Cited by the Examiner

UNITED STATES PATENTS

| 2,832,748 | 4/58 | Safford et al. | 260—889 |
| 2,888,424 | 5/59 | Precopio et al. | 260—889 |
| 2,912,410 | 11/59 | Cole | 260—889 |
| 2,927,904 | 3/60 | Cooper | 260—889 |
| 2,938,012 | 5/60 | Filar | 260—88.2 |
| 3,012,016 | 12/61 | Kirk et al. | 260—88.2 |
| 3,012,020 | 12/61 | Kirk et al. | 260—88.2 |
| 3,047,552 | 7/62 | Reynolds et al. | 260—88.2 |

FOREIGN PATENTS

| 217,159 | 5/57 | Australia. |

WILLIAM H. SHORT, *Primary Examiner.*

D. ARNOLD, LEON J. BERCOVITZ, *Examiners.*